United States Patent
Clark

[15] 3,639,671
[45] Feb. 1, 1972

[54] FILTER ARRANGEMENT IN COMPRESSED-GAS-INSULATED ELECTRICAL CONDUCTORS

[72] Inventor: Robert M. Clark, Ligonier, Pa.
[73] Assignee: I-T-E Imperial Corporation, Philadelphia, Pa.
[22] Filed: Aug. 31, 1970
[21] Appl. No.: 68,152

[52] U.S. Cl. ............................174/14 R, 174/16 B, 174/28, 174/99 B
[51] Int. Cl. ............................H02g 5/06, H01b 9/06
[58] Field of Search ............174/14 R, 15 C, 16 B, 21 R, 174/21 C, 22 R, 22 C, 23, 28, 99 R, 99 B, 99 E, 100

[56] References Cited

UNITED STATES PATENTS

| | | |
|---|---|---|
| 2,713,081 | 7/1955 | Merrell ............................174/14 R |
| 2,811,573 | 10/1957 | Williams ............................174/14 R X |
| 2,878,300 | 3/1959 | Rugg ............................174/15 C |

FOREIGN PATENTS OR APPLICATIONS

| | | | |
|---|---|---|---|
| 476,379 | 9/1969 | Switzerland | ............................174/99 E |

Primary Examiner—Laramie E. Askin
Attorney—Ostrolenk, Faber, Gerb & Soffen

[57] ABSTRACT

A microporous filter is located within the hollow inner conductor of a high-voltage gas-insulated transmission system including two concentric conductors. The filter prevents metallic dust particles, which may be present in the conductors, from migrating through the system to prevent any reduction in the dielectric breakdown voltage level of the system.

4 Claims, 5 Drawing Figures

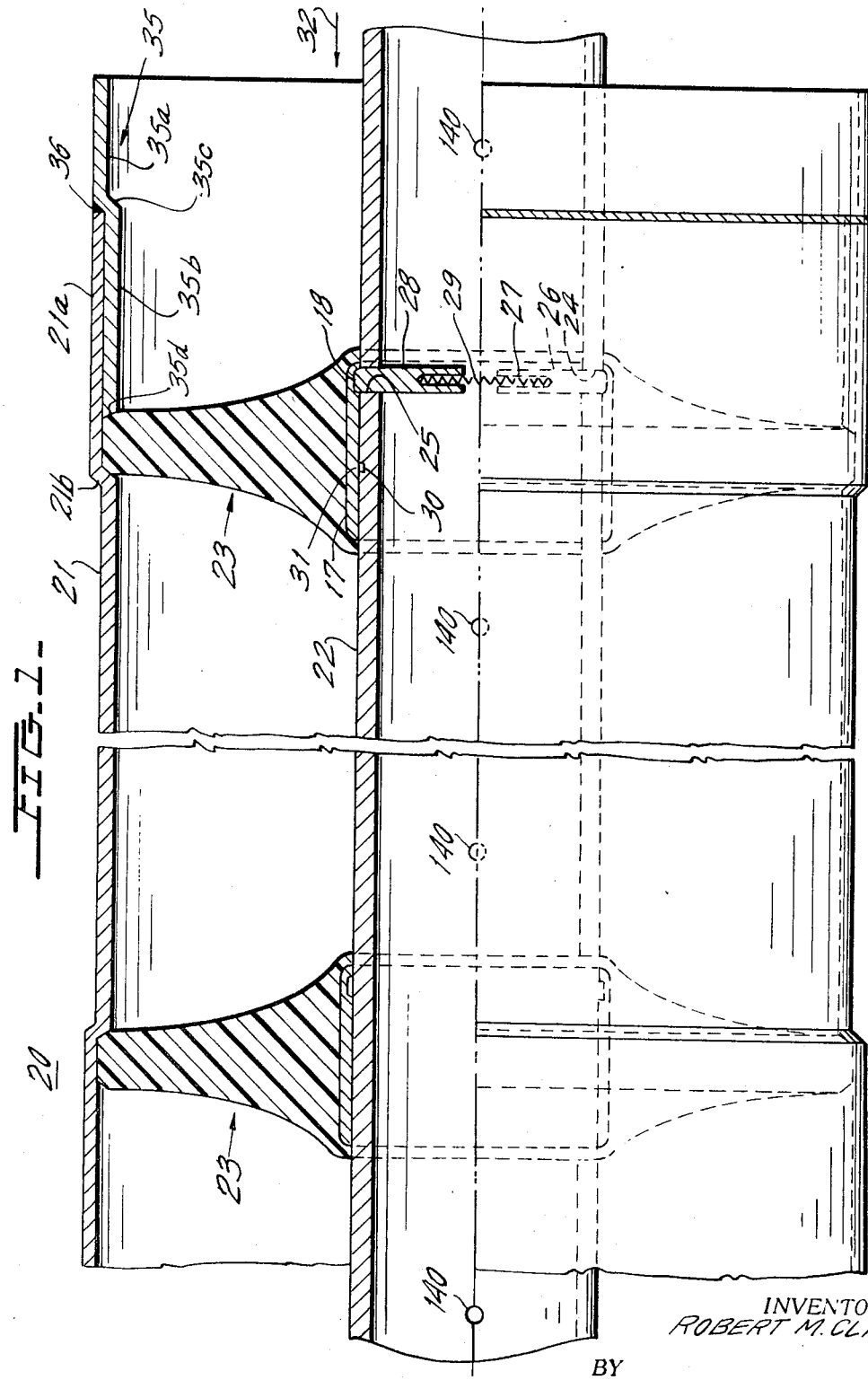

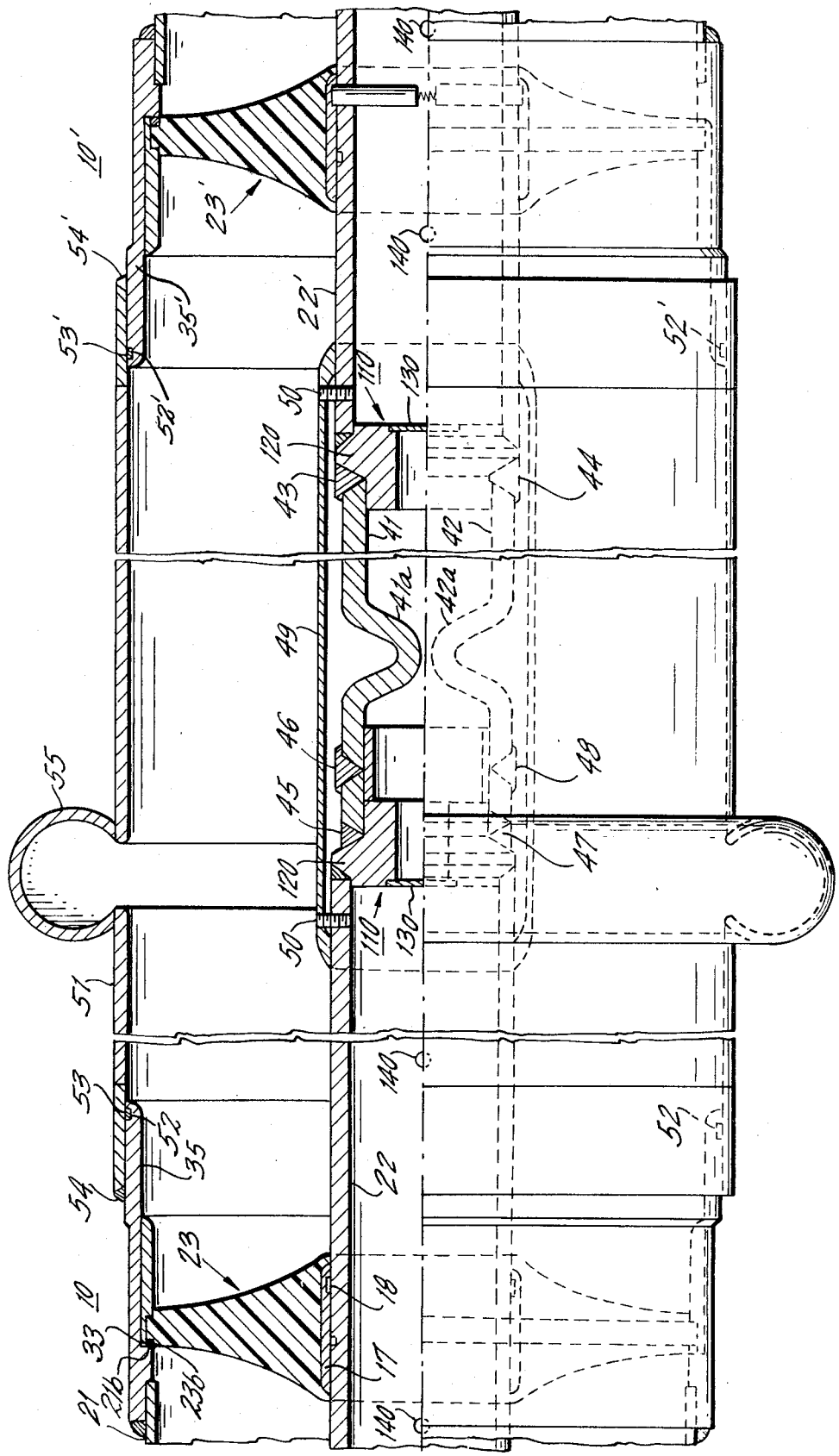

INVENTOR.
ROBERT M. CLARK
BY
Ostrolenk, Faber, Gerb & Soffen
ATTORNEYS

FILTER ARRANGEMENT IN COMPRESSED-GAS-INSULATED ELECTRICAL CONDUCTORS

The present invention relates to compressed-gas-insulated electrical conductor systems, and, more particularly, to the use of a particle filter located within the inner conductor tube of such a system to limit reduction in dielectric breakdown voltage due to the presence of dust particles in the system.

Compressed-gas-insulated conductors are normally comprised of metal-enclosed high-voltage electrical conductors in which a hollow metallic conductor is centrally supported within a surrounding grounded metal enclosure by means of a disk-shaped insulator. The interior hollow space is filled with a high dielectric compressed gas, such as sulphurhexafluoride (SF–6). A bus of this type is employed in electrical substations, or generating stations or for transmission of electrical power over either short, intermediate or long distances. Such metal enclosed high-voltage electrical conductors may be at ground level, buried underground or supported at some convenient height above ground. The principal advantage of compressed-gas-insulated bus, as compared with conventional unenclosed bus, is a tremendous reduction in the spacing between phases of multiphase bus systems. Unenclosed extra high voltage (EHV) bus normally requires ground clearances of 1 to 15 feet and phase-to-phase spacings of 15 to 25 feet. Metal enclosed compressed gas bus, however, requires ground clearance of as little as 4 to 10 inches and phase spacings of the order of 24 to 42 inches for the same voltage ratings. In addition thereto, the compressed gas insulated bus having a grounded metal enclosure for each phase offers greater reliability and safety as compared with conventional open EHV conductors.

A considerable amount of research has been conducted in the field of compressed-gas-insulated electrical conductors and a few installations have been constructed. Many of the techniques used employed bolted and gasketed joints for the enclosure tubing, with the enclosures being provided with flanges which are welded to individual sections of the tubing. Adjacent sections are then bolted together by means of a multiplicity of bolts disposed around the flanges so that the axes of the bolts are substantially parallel to the axis of the conductor. Such joints between adjacent sections are usually arranged to be located at each support insulator which is provided to hold the conductor in a position concentric with the enclosure tube. Gaskets are used to prevent the gas from leaking out into the atmosphere and are secured between the bolted flanges. Experience in this field has shown that sections constructed in this manner can be joined to form an overall system totaling, in some cases, up to one mile in length, and more.

These field tests have also shown an increased tendency for electrical breakdown to occur as the length of the system is increased, however. More particularly, it has been noted that the dielectric breakdown voltage is reduced as additional insulator sections are joined in the line, permitting breakdown to occur on succeeding over voltage surges on the system. Tests have been conducted to determine the probable cause, with the result noted that this tendency to break down follows the migration of metallic dust particles through the system to establish a point or points of high dielectric stress. Such particles may exist in the form of actual particles of iron or steel chipped away during the fabrication of the individual enclosures and remaining as part of the system despite the taking of extensive measures for their removal. These particles have been found also to be generated by vibration of the enclosures during shipment or installation and due to the thermal contraction and expansion of the conductors during normal system operation. Convection currents generated in the system either as a result of thermal or pressure gradients cause the metallic particles to migrate from section to section, whereby a collection of particles in one locale may cause electrical breakdown. The voltage gradient between the grounded metal enclosure and the central conductor causes the particles to move back and forth between the metal enclosure and the conductor under the influence of the alternating waveform to itself produce, as by collision with these metallic components, additional particles to further compound the problem.

As will become clear hereinafter, the present invention relates to the use of microporous filters arranged at spaced intervals along the bus run to isolate and thereby separate the system into individual gas compartments such that the migration of the metallic dust particles is substantially reduced. According to the invention, the inner conductor of the enclosure is selected to have one, or a plurality of apertures along its length to permit the pressurized insulating gas which fills the space between the central conductor and the grounded housing to move between the conductor and the metal enclosure. The conductor, which acts as a gas manifold, is provided with a microporous filter to trap the enclosed particles in a region where they will not be exposed by a high gradient voltage electric field. The filters effectively prevent any significant accumulation of migrating particles, even over long bus runs. In this manner, the trapped particles no longer are free to migrate between the two concentric conductors to reduce the dielectric breakdown level of the bus.

Accordingly, it is an object of the present invention to provide a compressed-gas-insulated electrical conductor system employing a filter to prevent the migration particles through the bus.

It is another object of the invention to provide such a system in which individual sections each include such a filter so as to compartmentalize the bus run and prevent particles from migrating through the system.

These and other objects of the invention will become clear from a consideration of the following description taken in connection with the drawings in which:

FIG. 1 shows an elevational view partially sectionalized of a compressed-gas-insulated enclosure section employed in the present invention;

FIG. 2 is a sectional view showing the manner in which two enclosure sections of the type shown in FIG. 1 are joined together.

Figure 5:
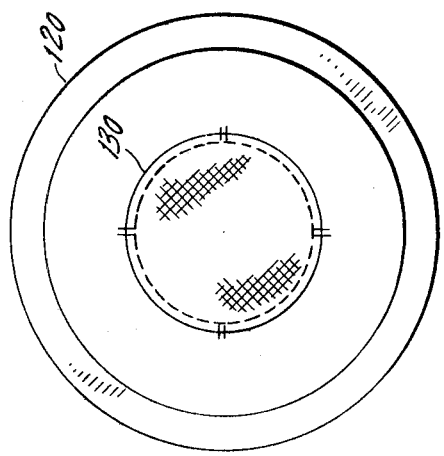
FIGS. 3–5 show side, front and rear views respectively, of a microporous filter used to compartmentalize the enclosure sections of FIG. 2 in accordance with the invention.

Referring now to the drawings, FIG. 1 shows a typical enclosure section employed in a compressed-gas-insulated electrical conductor system. As shown, the compressed-gas-insulated conductor section 20 is comprised of an elongated, electrical conductor system. As shown, the compressed-gas-insulated conductor section 20 is comprised of an elongated, substantially cylindrical-shaped conductive enclosure 21 surrounding a hollow tubular conductor 22 which is maintained in a position concentric with enclosure 21 by means of insulating spacers 23 provided at spaced intervals along the bus. Such spacers as are preferably employed at the opposite ends of the conductor section may be of the type described in copending U.S. application Ser. No. 809,889, filed Mar. 24, 1969, now U.S. Pat. No. 3,573,341 issued Apr. 6, 1971 and assigned to the assignee of the present invention. Similarly, the insulated spacer(s) provided intermediate the ends of the section may be of the type set forth in detail in copending application Ser. No. 813,181, filed Apr. 3, 1969, now abandoned and also assigned to the assignee of the instant case. Detailed descriptions of the configuration and functionings of these spacers will be omitted herein for purposes of simplicity with the descriptions of the above-mentioned copending applications being herein incorporated by reference. For the purposes of understanding this invention, it is sufficient to note that these spacers provide for concentric support of the tubular conductor 22 within the enclosure 21, while, at the same time, providing excellent protection against gas leakage through the use of a sealing arrangement which eliminates any leakage from the enclosure interior.

Since the manner in which the left and right-hand spacers 23 are secured near the ends of enclosure section 21 are substantially identical, a description of only the right-hand spacer assembly will be given herein for purposes of simplicity, it being understood that the left-hand spacer assembly is substantially identical in both configuration and function.

It can be seen that the enclosure section 21 is provided near its right-hand end with an enlarged diameter section 21a joining the intermediate section 21 by means of a shoulder 21b. The right-hand end insulating spacer is mounted upon the tubular conductor 22 which is telescoped through the central opening of the spacer, understood to be generally disk-shaped. Tubular conductor 22 is provided with a pair of openings 24 and 25, which openings have their centers lying along imaginary line 26 which is colinear with the diameter of tubular conductor 22. A pair of plungers 27 and 28 are positioned within the interior of tubular conductor 22 and are urged outwardly to project out of the openings 24 and 25, respectively, under the force of a compression spring 29. The plungers firmly lock spacer 23 to tubular conductor 22 in the following manner.

After the plungers 27 and 28 and compression spring 29 are mounted into the tubular conductor 22, they are urged toward one another to permit the insulating spacer 23 to be slid freely over the openings 24 and 25. The plungers 27 and 28 are then released and the spacer 23 is slid toward the left until the recess 18 is positioned immediately above the openings 24 and 25. At this time, the plungers 27 and 28 "snap" outwardly and enter into recess 18 where they are seated in retaining position under the force of compression spring 29 so as to prevent any relative linear motion between spacer 23 and conductor 22.

Tubular conductor 22 is further provided with a groove 30 continuously surrounding a gasket 31. Gasket 31 formally bears against the interior surface of conductive ring 17 of spacer 23 to prevent leakage or passage of compressed gas past the gasket in either direction. Once the insulating spacer 23 is adequately secured to the tubular conductor 22, the tubular conductor is inserted into enclosure 21 in the direction shown by arrow 32.

FIG. 2 shows a slightly modified embodiment wherein a ring-shaped gasket 33 is positioned along the bevelled edge 23b of insulating spacer 23, and is compressed between the bevelled edge 23b and the shoulder 21b of enclosure 21 as the tubular conductor 22 is firmly urged into enclosure 21. The gasket is preferably coated on both surfaces thereof with an unfilled epoxy resin prior to being pressed into place against the shoulder of the duct cover.

As is shown in FIG. 1, a duct cover end 35 which is comprised of an enlarged diameter section 35a joined to a reduced-diameter section 35b by means of a shoulder 35c, is telescoped into the right-hand end of enclosure 21 in the manner shown in FIG. 1 so that its extreme left-hand edge 35d firmly bears against the insulating spacer 23. Sufficient pressure is applied to the duct cover end 35 to compress the gasket and thereby firmly secure the insulating spacer between the shoulder 21b of enclosure 21 and the extreme edge 35d of duct cover end 35. While this pressure is being maintained, the duct cover end 35 is tack-welded to enclosure 21 in the region 36 of shoulder 35c so as to firmly maintain the duct cover end 35 in place when the holding pressure is released. The weld is then sealed and ground smooth to facilitate the application of the enclosure 21 in a manner to be more fully described.

Adjacent enclosure sections are secured to one another in the manner shown best in FIG. 2 which illustrates a portion of a left-hand section 10 and a portion of a right-hand section 10'. A flexible conductor assembly comprised of a pair of spaced parallel flexible conductor members 41 and 42 are secured at their right-hand ends with the left-hand ends of tubular conductor 22' in any suitable manner—such as, by welding, which welds are shown at 43 and 44, respectively. Tubular conductor 22 extends a greater distance beyond its duct cover end 35 than tubular conductor 22' extends beyond its duct cover end 35'. The left-hand end of conductive members 41 and 42 are coupled to the right-hand end of conductor 22 such as, for example, by welding at the locations 45, 46, 47 and 48. The bent portions 41a and 42a in conductors 41 and 42 are provided for the purpose of allowing for expansion and contraction of these conductors as well as conductor 22 and 22'.

As was previously described, the spacer member 23' is fixedly secured to tubular conductor 22'. However, the plunger assembly 27–29 shown in FIG. 1 is eliminated from the spacer assembly 23 to allow conductor 22 to move relative to spacer 23 to allow for expansion and contraction of tubular conductor 22 as it cycles during operation.

After the field welds 43–48 are completed, the cylindrical-shaped enclosure 49 is telescoped over the spaced parallel conductive members 41 and 42 as well as the field welds. Just prior to the field-welding operation, the tubular enclosure 49 is positioned well to the left of the area being field welded and is slid into the position shown in FIG. 2. Either one of the setscrews 50 are inserted into suitable tapped apertures provided in enclosure 49 to retain the enclosure 49 in the position shown. One of the setscrews is preferably eliminated to allow for relative differential expansion and contraction between enclosure 49 and the elements which it surrounds. Enclosure 49 thus provides a smooth conductive surface around the assembly which it surrounds to prevent the formation of corona.

The slide cover 51, which is preferably telescoped over the left-end enclosure section which includes spacer assembly 23, is telescoped over this assembly to provide adequate room for working on the installation of conductors 41 and 42. The duct cover end sections 35 and 35' are preferably provided with continuous annular-shaped grooves surrounding the exterior surface of the duct cover ends and designated by the numerals 52 and 52', respectively. These grooves receive gaskets 53 and 53' which act to seal the interior space enclosed by slide cover 51 when positioned as shown.

The slide cover, when moved to the position shown in FIG. 2, is seal-welded at the locations 54 and 54' to completely seal the interior enclosed by the slide cover and to prevent the escape of any compressed gas from the interior of the structure. The gaskets 53 and 53' prevent metallic particles, gases, or other harmful elements from entering into the interior region of the slide cover after positioned in place. Once the field-welds provided at the locations 54 and 54' are completed, the functions of the gaskets 53 and 53' have actually been terminated.

To allow for proper expansion and contraction of the enclosure 21 and 21', the central portion of slide cover 51 is provided with a truncated toroidal-shaped enclosure section 55 which is jointed at its opposite edges to slide cover 51, as shown in FIG. 2, to allow for expansion and contraction of the enclosures 21 and 21' as well as the sections of the slide cover 51 lying to the left and right of the toroidal-shaped enclosure section 55. In this manner, it can be seen that the field installation of adjacent enclosure sections will be completely independent of the installation of the insulating spacers which are fully installed into position in the factory, thereby completely avoiding the need for sealing the insulating spacers in the field, to thus reduce the number of insulation activities to be performed. In addition to the above advantage, each compressed gas conductor section may be completely and thoroughly tested to establish its leakproof characteristics prior to shipment, still further reducing field installation, time and complexity.

As thus far described, the system of FIG. 2 is similar in many respects to that disclosed in the aforementioned U.S. Pat. No. 3,573,341. Each inner conductor section 22, 22' is provided with apertures (as at 140) to permit the entry of pressurized gas into the section and to permit the gas to flow from the inner conductor 22, 22' to fill the void between the conductor and the metal enclosure. In this manner the high dielectric characteristic associated with the sulphurhexafluoride type of gas may be established to provide the required dielectric level.

However, when testing bus assemblies of the type so far described, it was noted that the dielectric breakdown voltage tended to decrease as additional insulator sections were joined in the line, thus permitting electrical breakdown to occur in subsequent stages on succeeding overvoltage surges. After conducting tests to determine the basis for this situation, it was found that the tendency to break down resulted from the presence of metallic dust particles in the system even though during the fabrication of the individual insulator sections, extreme measures (such as repeated use of acid baths) were taken to eliminate such particles. It was also determined that such particles had a tendency to oscillate back and forth between the metal enclosure and the central conductor tube under the influence of the alternating voltage waveform on the conductor such that, with the high voltages envisioned, sufficient energy was acquired by these accelerating particles to dislodge further particles from the enclosed wall itself so as to increase the number of free particles within the bus. All these metallic particles were then determined to flow along the system with the introduction of pressurized gas so as to accumulate at the furthermost end to establish a point of high dielectric stress at that vicinity. Following this migration, it was noted that breakdown might indeed be pronounced, especially where the cleansing measures employed in the fabrication process were not so effectively controlled.

In accordance with the present invention, on the other hand, there is provided, as shown in FIG. 2, a filter and plug assembly 110 intended for insertion in the hollow inner conductor tube and arranged to intercept the passage of pressurized gas therethrough. More particularly, the filter is selected of a mesh size sufficiently large so as not to interfere with the gas passing therethrough but small enough to trap most, if not all, of the metallic particles.

Figure 3:
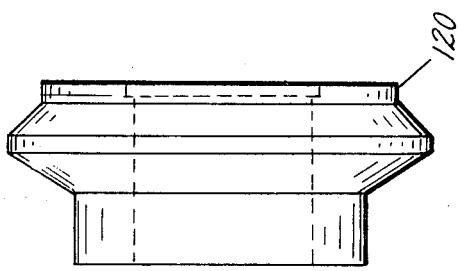
Figure 4:
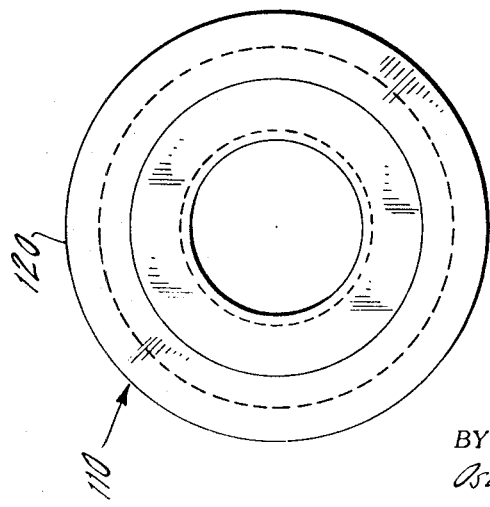

Such filter means is shown in the views of FIGS. 3-5, where it will be noted that the assembly 110 generally conforms in shape to the inner section of the current carrying conductor 22 of the bus section. As will more particularly be seen from FIG. 2, the circular-shaped steel screen is mounted within an annular-shaped plug member 120. The particle impervious portion 120 of the filter assembly 110 substantially fills the interior of the bus section 22 such that the exiting of any gas therein can be had only through the porous filter portion 130. Such filter portion 130 is selected to be sufficiently porous to permit the substantially uninhibited movement of the compressed gas from one bus section to the next, but not so porous as to permit passage of the metallic dust particles which may be present at the conductor or which may be generated due to further dislodgement resulting from voltage polarity changes. In this manner, upon the introduction of the compressed gas into the system and upon the operation of the system, the dust particles present within the hollow conductor 22 are prevented from migrating down along the system. At the same time, it will be remembered that the spacer 23 generally conforms to the interior hollow section of the enclosure 21 so that any particles present there will similarly not be permitted to migrate down the system under the influence of the compressed gas filling the space between the enclosure and the conductor through the conductor apertures 140. As a result, the tendency for the particles to migrate along the bus run is prevented thereby maintaining the integrity of the dielectric level. Such suitable filter elements which may be employed in the present invention are steel or other metallic screens, metallic honeycomb structures and microporous metallic wafers as are described in the brochure entitled "METALLIC FILTER ELEMENTS," obtainable from the Mott Metallurgical Corporation of Hartford, Connecticut.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. A bus run comprising:
    an elongated hollow conductor;
    an elongated metallic enclosure surrounding said conductor and being airtightly sealed over its entire length;
    insulating spacer means arranged at spaced intervals within said enclosure and positioning and maintaining said conductor spaced from said enclosure;
    plural filter means positioned at spaced intervals within the hollow interior of said conductor to divide the interior region of said conductor into a plurality of sections;
    said conductor having openings at spaced intervals for communicating the region exterior of said conductor to the region interior of said conductor;
    the regions interior and exterior of said conductor containing an insulating gas free to migrate between said interior and exterior regions;
    each of said filter means being of a porosity so as to prevent particles which may be present within any section between adjacent filter means from migrating to an adjacent section while having a porosity sufficient to enable the insulating medium to move freely through any of said filter means.

2. The assembly of claim 1 wherein said filter means is comprised of a metallic microporous wafer having a porosity sufficient to permit passage of said insulating gas but insufficient to permit passage of particles between adjacent sections of the bus run.

3. The bus run of claim 1 wherein each of said filter means is comprised of a circular-shaped filter member mounted within the central opening of an annular shaped plug member;
    said plug member being positioned at a predetermined location within the interior of said hollow conductor.

4. The assembly of claim 1 wherein said compressed gas is sulphur-hexafluoride.

* * * * *